Patented Aug. 11, 1936

2,050,272

UNITED STATES PATENT OFFICE 2,050,272

MANUFACTURE OF CHEWING GUM BASE

Franklin V. Canning, New York, N. Y., assignor to Sweets Laboratories, Inc., New York, N. Y., a corporation of New York No Drawing. Application February 16, 1931, Serial No. 516,224. Renewed September 18, 1934

14 Claims. (Cl. 99—135)

The present invention relates to producing an intimate mixture including milled unvulcanized rubber, a hard fat such as high melting point hydrogenated oil, and a resinous material such as coumarone resin, which shall be free from "burnt rubber taste". The specific embodiment of the invention which will be hereinafter fully discussed is the manufacture of chewing gum base, but it will be understood that the product can also be employed for other purposes, to some extent.

Products are already disclosed in the literature, and in the patents, for producing chewing gum by the addition thereto of sweetening and flavoring materials, such products being known in the art as "chewing gum base".

It has heretofore been proposed to produce chewing gum base from rubber, a hard fat such as hydrogenated oil of a melting point between 52 and 65° C., and a resinous material for example coumarone resin, (see for example U. S. Patents 1,534,929—1,534,930 and 1,534,931, H. V. Dunham, issued April 21, 1925). In said processes however the oil or oil and resin was melted and the rubber dissolved in the molten material, at a temperature of about 150° C. (302° F.). It is found that when the rubber is dissolved in the molten oil at such a high temperature, certain changes take place, often resulting in a "burnt rubber taste" which taste cannot readily be removed from the mass. In addition to the "burnt rubber taste" products so produced have an excessively sticky character which is objectionable, and which it is difficult to wholly overcome, even in the final chewing gum. The absolutely complete removal of burnt rubber taste and odor, after the same has developed in the mass, is believed to be impossible.

Research has developed that the above objectionable properties are produced by too strong heating of the rubber at the stage of the process indicated, and it has been shown that the maximum temperature to which the rubber can be safely heated is substantially below 150° C., in fact about 250° F., or 121° C. This temperature should not be exceeded, during the preliminary treatment of the rubber, or during the step of mixing the rubber in the hydrogenated oil or other hard fat.

Also during the entire process of making the chewing gum base, it is essential that the rubber should not be heated to such temperatures as would produce a "burnt rubber taste" in the product, to any substantial extent, if the product is to be made into first quality chewing gum.

In carrying out the process of the Dunham patents above mentioned, it may often happen that some of the pieces of rubber do not dissolve or do not wholly dissolve in the molten mixture of oily and resinous constituents, but some of the pieces of rubber may swell up into somewhat softened masses of a somewhat gelatinous consistency, which may remain suspended in the mixture. These are composed of rubber which is substantially unblended with the other components. These swollen gelatinous masses are composed essentially of rubber that has not become homogeneously blended with the oily and/or resinous constituents. In many cases the swollen rubber particles would not dissolve entirely, on heating and stirring for a long period. Keeping the mixture hot, for a long period, is undesirable, on account of increasing the stickiness and greater liability to produce or increase the "burnt rubber" taste.

Based upon my researches, the following is given as the preferred example of my novel process of making chewing gum base.

Example

A given amount, say 50 pounds, of gum rubber, preferably that known as "latex gum" (unvulcanized) is milled, on the usual two roller mill, say for 10 to 15 minutes, the rollers being first pressed together tightly so that they are either in actual contact or substantially in contact, before the rubber is put in. The rolls are initially cold and a current of cold water passes through the rolls throughout this process, to prevent undue rise of temperature in the rubber. It will be understood that under these conditions the material will heat up a good deal, due to the friction and the work exerted in milling the rubber. During this operation, even with efficient cooling the material on the rolls may heat up to such a degree that it is uncomfortable to handle it with bare hands. The operation is so conducted as to allow the material to cool substantially during the milling operation. After running for 10 to 15 minutes in this manner, the rolls may be separated a little, say a tenth to a quarter of an inch, and the milling continued for another 10 or 15 minutes, during which operation it is not necessary to continue the flow of cooling water since the amount of heat generated during such operation is relatively small.

The rollers are again then forced together (as in the first stage of the roll-milling), and the material is run through the rollers again once or twice, and is then allowed to cool naturally for say half an hour to an hour.

During the milling of the rubber it is advisable to strip the rubber from the rolls, either partly or wholly, from time to time, in order to assist in the removal of the generated heat from the rubber, and to get better kneading.

As a result of this treatment of the rubber, it will be found that the tensile strength of the rubber has been very substantially reduced, and that the rubber has in effect been partly broken down.

After the milled rubber has been cooled it is mixed with say an equal weight of hydrogenated oil. For this purpose a hard hydrogenated cottonseed oil is very satisfactory, having a melting point of about 52 to 70° C., for example hydrogenated cottonseed oil of melting point 56 is very satisfactory.

The rubber and hydrogenated oil are worked together in any suitable manner, for example on the roller mill above referred to until thoroughly homogeneous. During this operation the material will warm up slightly, say to 130 to 150° F., more or less.

The working on the rolls in order to produce a thorough mixture of the two materials may require about 15 to 25 minutes. This mixture will be found to be free from the particles of unblended rubber, referred to above, i. e. it is a substantially homogeneous blend of the roll milled rubber and hydrogenated oil.

The material is then stripped off the rolls, and is allowed to stand for any desired length of time. Experience has shown that (other things being equal) the longer the material is allowed to stand at this stage the harder will be the resulting chewing gum base.

The above material will of course cool off, for example, to room temperature during the storing operation.

The remainder of the resin and oil to be used in making the chewing gum are placed in a kettle provided with a good agitator. A steam heated Werner and Pfleiderer kneading machine is very satisfactory. A considerable quantity of water is preferably added at this stage, then the above mixture of rubber and hydrogenated oil is added and the materials stirred or kneaded until uniform. During this operation hydrogenated oil, melting within the range above indicated is added, for example hydrogenated peanut oil, and the amount thereof may be from 50 to 250 parts, by weight, (to 50 pounds of the rubber above referred to). Coumarone resin used in this step may amount to 150 to 300 lbs., and is preferably composed of about equal parts of low melting point coumarone resin, melting at say 60° C., and high melting point resin melting at say 140° C. It will be understood that the hydrogenated oil and the resin can be added either all in one batch or in several lots. It will be understood that the proportions of the materials to be employed can vary within rather wide ranges. The amount of water used may be about equal to the combined amounts of the other materials, but the water can vary between wide limits.

For one very satisfactory chewing gum base I may employ 10 parts of rubber, 40 parts of hydrogenated oil and 50 parts of coumarone resin, by weight.

The jacket of the kettle carries steam at a pressure up to 40 to 50 pounds, and the water in the mixture prevents excessive rise of temperature so that ordinarily the temperature in the mixer will not substantially exceed 230° F., or at any event will not substantially exceed 240° F. The temperature does not melt the material, but softens the same to a mass of a consistency resembling soft putty, and the water in the mixer will be more or less mixed with the softened mass.

The mixer is run until the mixture is uniform and thoroughly mixed, at which stage there may still remain 5 to 6% of water, or even up to 10% of water in some cases. The mixer of course is not closed during the operation so that steam can constantly escape from the same, the boiling of the water and the escape of the steam keeping the temperature of the material in the mixer down to the limits above referred to.

The mixture is then run out of the mixer into suitable pans, and cooled to harden the same, and is then ready for being worked up into chewing gum, by the addition of any suitable sweetening and flavoring materials and/or medicating agents.

It is to be noted that in the above example I have referred to adding hydrogenated cottonseed oil to the rubber on the roller mill, and have referred to adding hydrogenated peanut oil in the mixing kettle. Hydrogenated peanut oil, even of the same melting point would not work nearly as well on the rolls. In place of all or a part of the hydrogenated oil I may employ various other hard fats for example refined tallow, vegetable tallow, or waxy materials such as beeswax, Japan wax or mixtures of the above materials with paraffin wax, although paraffin wax is not satisfactory as a substitute for all of the hydrogenated oil. Various mixtures of hydrogenated oil, normally hard fats and waxes, or any of these with a certain amount of normally liquid oil can be employed. In some cases I may substitute cocoa butter, coconut oil or similar fats for a portion of the hydrogenated oil, to modify the consistency of the resulting chewing gum base. Tasteless white mineral oil may also be added.

I have above referred to unvulcanized latex rubber. In some cases I can substitute all or a part of this by a good grade of crepe rubber or partly by even a washed and purified pontianak, jelutong or the like. Chicle can also be added.

Reference is made above to the use of coumarone resin. In some instances it is possible to employ other artificial resins or to some extent natural resins in place of a part of the coumarone resin. Rosin esters can also be used in place of a part of the coumarone resin.

For most grades of chewing gum base it is not possible to perform all of the mixing operations on the roller mill, but in certain cases as where the percent of rubber is rather high, and the percentage of oil is low, it would be possible to perform the entire mixing operation on the roller mill.

If it is desired to add fillers or cheapening agents these may conveniently be added in the kettle, and well mixed into the mass.

Reference is made above to the patents to H. V. Dunham. In accordance with the present invention I not only eliminate the liability of producing "burnt rubber taste" or odor, and eliminate excessive stickiness and liability to leave particles of unblended rubber in the chewing gum base, but I produce a better consistency in the chewing gum base, and I produce the completed base in a substantially shorter period (even reducing the time to one-tenth of that required in Dunham's process). Also an excellent base for "bubble gum" can be produced by the present process, which would not ordinarily be produced by the Dunham process from the same components and in the same proportions. In my process, the materials are not substantially discolored.

I have referred above to producing the final mixing (mixing the rubber and hydrogenated oil composition with the other components of the base) in a Werner and Pfleiderer mixer. The mixer preferred is the "Light duty" modification, say "Type 7, Class B. B.," size 18, with a capacity of 2000 lbs., steam jacketed, operated by a 30 H. P. motor. This is very different from the Werner and Pfleiderer "Rubber mixer" which for the same capacity would require several times more power.

The roller mill may be of the type commonly used in the rubber industry.

I claim:—

1. The herein described process of making an intimate mixture, free from objectionable "burnt rubber" taste, containing rubber, hard fat and resinous material, which comprises roll-milling rubber until the same has been at least partly broken down and its tensile strength substantially reduced, such roll-milling being conducted at a temperature not substantially exceeding 250° F., to avoid the development of a "burnt rubber" taste, intimately mixing such rubber with a fat which is solid at normal room temperature, while at a temperature not substantially above 250° F., and thereafter thoroughly incorporating the mixture with said resinous material at not substantially above 240° F. to avoid developing a "burnt rubber" taste.

2. A process of making a chewing gum base which comprises roll-milling rubber, incorporating hard hydrogenated cottonseed oil, by working the mixture on rolls, and thereafter incorporating hydrogenated peanut oil and resinous material while in a warm state.

3. In the process of making a chewing gum base, the herein described improvement which comprises roll-milling high grade rubber sufficiently to reduce its strength, blending hard normally solid hydrogenated oil thereinto while further roll-milling the mass.

4. Chewing gum base containing as its essential constituents, 10 parts of roll-milled high grade rubber, about 40 parts of normally solid fat, consisting in major part of hydrogenated normally liquid oil, and about 50 parts of a normally solid resin.

5. A process of making a chewing gum base which comprises roll-milling rubber, incorporating hard hydrogenated cottonseed oil therewith, by roll-milling, both of said steps being conducted at temperatures not substantially over 240° F., and thereafter incorporating hydrogenated peanut oil with the mixture while in a warm state and in the presence of water.

6. In making chewing gum base, the steps of roll-milling high grade rubber, sufficiently to substantially reduce its resiliency, while maintaining a temperature in the mass not substantially above 240° F., to avoid producing a "burnt rubber taste" therein, and compounding the roll-milled rubber with a hard fat at not substantially above 240° F., and converting the mixture into a chewing gum base.

7. A process as in claim 1, in which the step of incorporating the resinous material is conducted in the presence of hot water.

8. A process of producing a chewing gum base which comprises roll-milling rubber to an extent sufficient to at least partially break down the same, all while preventing rise in temperature in said rubber up to substantially over 240° F., then, while continuing said roll-milling operation, blending the said rubber with a normally solid fatty material, and thereafter blending said mixture with more fatty material and with a resinous material.

9. In the manufacture of chewing gum base, the herein described improvement which comprises roll-milling rubber sufficiently to partly break down the same, while maintaining a temperature in said rubber not substantially above 240° F., and incorporating a fatty material which is solid at normal room temperature, with said roll-milled rubber, by roll-milling said rubber and fatty material with each other.

10. A process as in claim 1, in which the said hard fat is a hydrogenated cottonseed oil.

11. A chewing gum base containing roll-milled high grade unvulcanized rubber, as a constituent, such rubber being of substantially less resiliency than high grade unmilled rubber, but retaining some small degree of resiliency.

12. A chewing gum material containing roll-milled high grade unvulcanized rubber, blended with fatty and resinous constituents.

13. A chewing gum material containing roll-milled high grade unvulcanized rubber, as a constituent thereof.

14. Chewing gum base containing roll-milled rubber and normally solid hydrogenated oil, thoroughly blended together.

FRANKLIN V. CANNING.